United States Patent [19]

Conley, III et al.

[11] Patent Number: 4,943,756

[45] Date of Patent: Jul. 24, 1990

[54] CONTROL OF HYDRAULIC SYSTEMS

[75] Inventors: Walter Conley, III; Kim A. Klopfleisch, both of St. Marys, Ohio

[73] Assignee: Crown Equipment Corporation, New Bremen, Ohio

[21] Appl. No.: 446,274

[22] Filed: Dec. 5, 1989

[51] Int. Cl.[5] .......................... G05B 11/01; H02P 7/00

[52] U.S. Cl. .................................... 318/671; 318/139; 318/489; 318/558; 60/911; 60/434

[58] Field of Search ............... 318/139, 470, 480, 484, 318/489, 558, 671; 60/422, 423, 433, 434, 494, 911; 91/530; 254/2 R, 11, 93 R, 93 A; 417/17, 18, 22, 23, 24, 26, 41, 42, 44, 46, 253, 256, 278, 279

[56] References Cited

U.S. PATENT DOCUMENTS

| | | | |
|---|---|---|---|
| 2,384,420 | 9/1945 | Griswold | 417/17 X |
| 3,161,137 | 12/1964 | Thoma et al. | 417/316 X |
| 3,803,844 | 4/1974 | Gatiss | 60/423 X |
| 3,854,381 | 12/1974 | Schexnayder | 91/530 |
| 4,097,791 | 6/1978 | Bivens et al. | 318/484 |
| 4,102,132 | 7/1978 | Palmer | 91/530 X |
| 4,485,623 | 12/1984 | Chichester et al. | 60/422 |
| 4,559,777 | 12/1985 | Leiber | 60/422 |
| 4,587,808 | 5/1986 | Watanabe et al. | 60/911 X |

*Primary Examiner*—Bentsu Ro
*Attorney, Agent, or Firm*—Biebel, French & Nauman

[57] ABSTRACT

The precise and smooth control of the hydraulic fluid supplied to a hydraulic system, such as the lifting cylinders of a turret stockpicker, under varying operating conditions includes an optical encoder on the operator's control handle connected to an electronic control of a hydraulic pump motor, which s initially operated at a predetermined minimum speed, and a hydraulic valve which provides the initial control of hydraulic fluid under the control of an operator's handle. Because the pump is initially at a low speed, greater efficiency of the system is realized, an important feature in a battery operated vehicle. As the operator moves the handle from the off or neutral towards the fully open position, the hydraulic valve will open and reach its fully open position as the handle passes approximately the one-third on position. Pump motor speed is maintained at a minimum speed until the hydraulic valve is almost opened, and then the pump motor speed will be increased at a predetermined rate until its maximum speed has been obtained with the handle being almost fully on. The last few degrees of movement of the handle will not cause any further increase in hydraulic pressure or motor pump speed, but it will by-pass an SCR pump motor control circuit, thus further increasing efficiency.

13 Claims, 4 Drawing Sheets

CONTROL OF HYDRAULIC SYSTEMS

BACKGROUND OF THE INVENTION

This invention relates to an improved lift pump control for use in material handling vehicles.

In a materials handling vehicle, such as a turret stockpicker, the platform on which the operator rides, and which also carries the load handling forks, is typically raised by hydraulic means. In prior art vehicles, the operator manipulates a handle which in turn controls a valve supplying fluid from a pump to a hydraulic cylinder that lifts the platform. The pump in such a vehicle is normally operated at a speed that will supply the maximum flow of fluid need to raise the platform at the maximum rate. This means that the pump and the motor driving the pump are operated at maximum capacity at all times, even when a much slower rate of platform movement is desired. As a result, smooth and precise control of the platform's movement is sometimes difficult. Also significant power is wasted at lower speeds resulting in excess heat operation and reduced cycle life.

SUMMARY OF THE INVENTION

This invention provides for a method and apparatus permitting the precise and smooth control of the hydraulic fluid supplied to a hydraulic cylinder under varying operating conditions.

In the present invention, the pump motor is initially operated at a predetermined minimum speed and initial control of the hydraulic fluid is by means of a remote proportional valve controlled by the operator's handle. Because the pump is initially at a low speed, greater efficiency of the system is realized. This is especially important in a battery operated vehicle.

As the operator moves the handle from the off towards the fully open position, the valve will open gradually and then reach its fully open position as the handle passes approximately the one-third on position, but prior to this happening, the pump motor speed will be increased, and it will continue to increase until its maximum speed has been obtained with the handle being almost fully on. The last few degrees of movement of the handle will not cause any further increase in hydraulic pressure, but it will cause an electronic circuit to close and by-pass the control circuit, thus further increasing efficiency.

The shaft operated by the handle is connected to an optical encoder, and the output of this encoder directs a servo controlled valve connected between a pump and motor assembly and a manifold block, which distributes the hydraulic fluid to the lifting cylinders. The encoder also controls an SCR control circuit which supplies current to the pump motor.

Accordingly, it is an object of this invention to provide an improved method and apparatus for controlling the application of hydraulic pressure to a utilization device wherein a hydraulic pump is initially operated and maintained at a minimum predetermined speed to provide an initial output flow, and wherein the initial movement of a control handle first causes a valve to open and supply hydraulic fluid to the device, and wherein the pump speed will be increased as the valve approaches its fully open position.

It is a further object of this invention to provide a method for controlling the application of hydraulic pressure and flow from a motor driven pump through a hydraulic control valve to a utilization device in response to the position of a control handle, said method including the steps of establishing a minimum pump motor speed, controlling a hydraulic valve through which hydraulic pressure and flow is supplied to the utilization device by means of said handle wherein, as said handle is moved from an off to an intermediate position, said valve will progress from a fully closed position to a fully open position, and controlling said pump motor speed further to control hydraulic pressure and flow in response to movement of said handle from an intermediate position, prior to said valve becoming fully open, to an on position.

It is a still further object of this invention to provide an apparatus for supplying a controlled hydraulic pressure and flow to a utilization device which includes a control handle moveable through a predetermined distance, a hydraulic pump, an electric motor for driving said pump to supply hydraulic fluid under pressure, and a hydraulic valve responsive to the position of said control handle for controlling the flow of hydraulic fluid to the utilization device, wherein the improvement comprises means for sensing the position of said control handle, means responsive to said sensing means for controlling the speed of said pump motor, said means including means for establishing and maintaining a minimum pump motor speed, and circuit means for controlling said pump motor speed as said control handle is operated in an intermediate position.

Other objects and advantages of the invention will be apparent from the following description, the accompanying drawings and the appended claims.

DESCRIPTION OF THE PREFERRED EMBODIMENT

Figure 1:
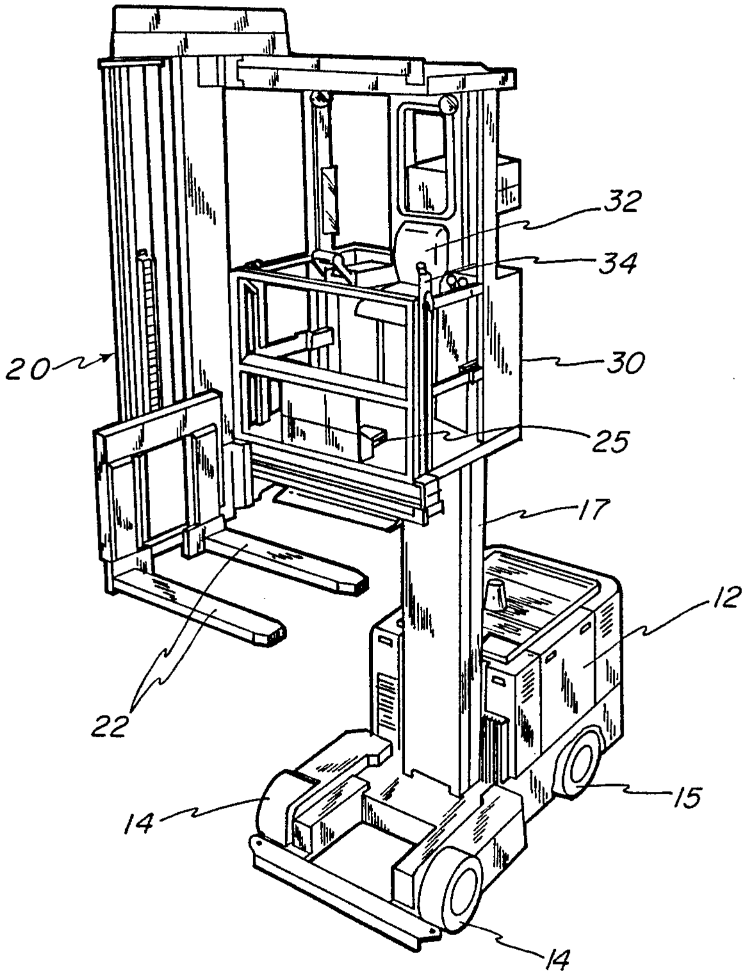
FIG. 1 is a perspective view of a materials handling vehicle, such as a turret stockpicker, that utilizes the improved hydraulic control system of the present invention.

Referring now to the drawings, and particularly to FIG. 1 which illustrates a materials handling vehicle, such as a turret stockpicker, the vehicle includes a power unit 10, a load handling assembly 20, and a platform assembly 30.

The power unit 10 includes a power source, such as a battery unit 12, a pair of load wheels 14 positioned under the platform assembly, a pair of steered wheels 15 positioned under the rear end of the power unit 10 with each wheel being driven by a traction motor, a mast 17 on which the platform assembly 20 rides, and a power unit electronic control unit 18 (FIG. 7).

The load handling assembly 20 includes a pair of lift forks 22 which may be raised and lowered, traversed and rotated relative to the platform assembly.

Figure 2:
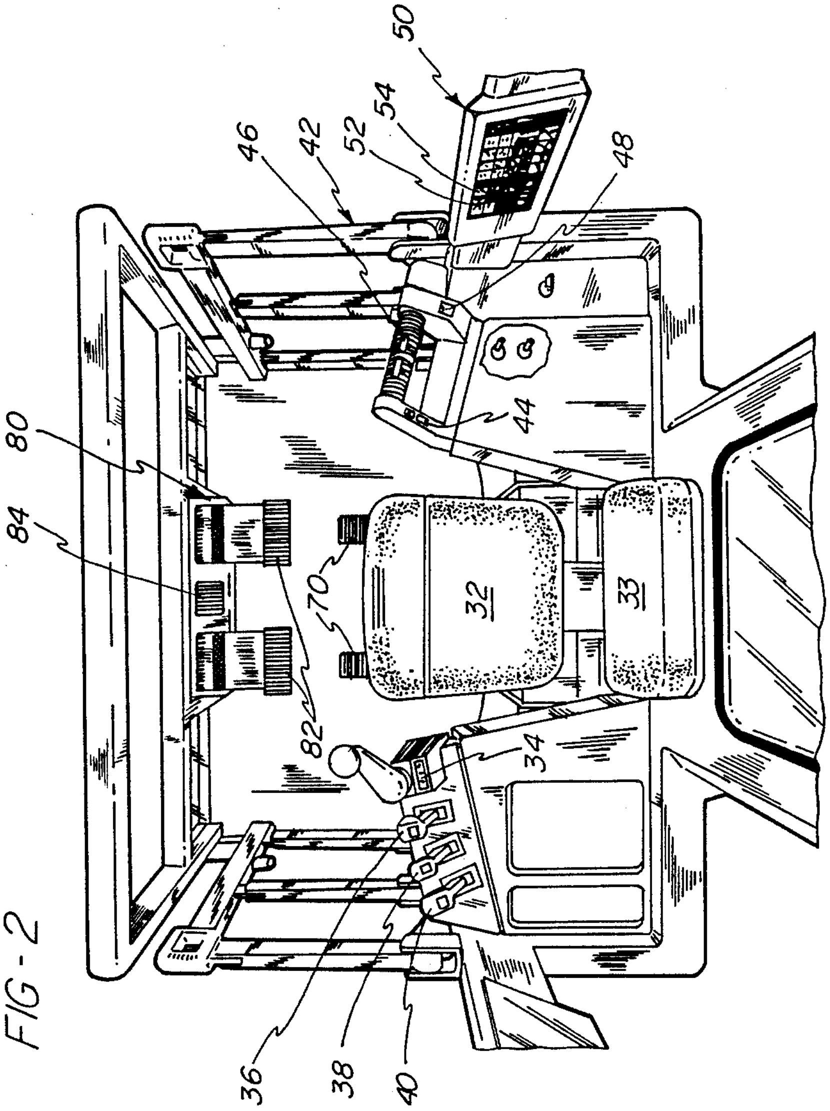
FIG. 2 a plan view of the operator's platform showing several control handles controlling hydraulically actuated devices.

The platform assembly 30 includes a seat 32 (FIG. 2), and back rest 33, from which the operator can operate various controls. On the left, the controls include a steering tiller 34, a fork raise and lower control 36, a fork traverse, retract and extend control 38, and a pivot control 40. On the right, the operator is provided with a traction motor control 42, which includes a horn switch 44, an accelerator twist grip and palm switch 46, and a power disconnect switch 48. An indicator control panel 50 to the right of the operator includes various indicator lamps, a guidance control switch 52, a parking brake switch 54 and various accessory control switches.

Figure 3:
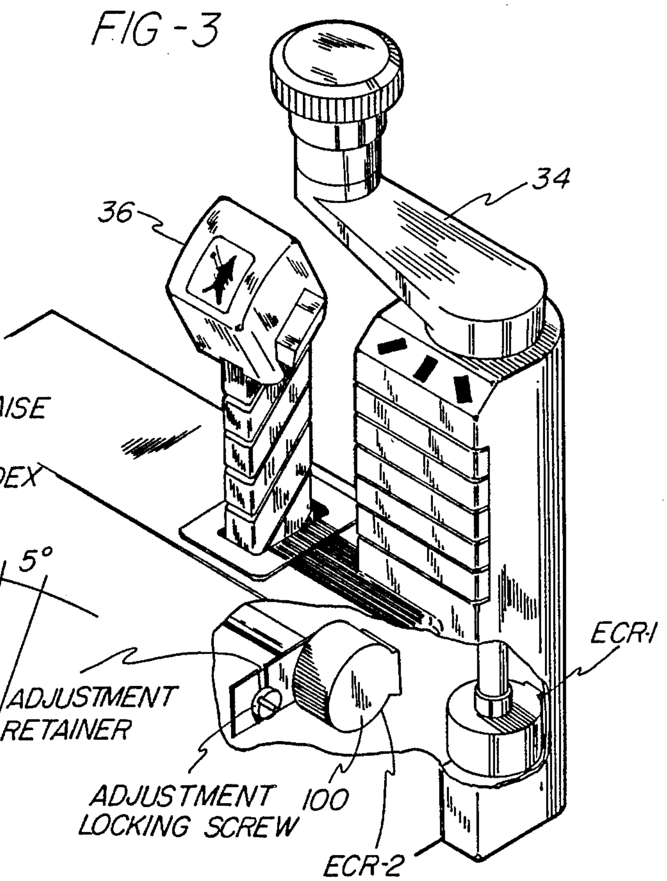
FIG. 3 is a perspective view of a control handles provided with shaft position encoders.

The handle 36 is spring biased to a neutral position, as shown in FIG. 3. Movement of the handle to the rear causes the forks to raise while movement toward the front will cause the forks to lower. The amount of rotation of the control handle 36 is monitored by an encoder 100. The encoder may be of the type described in copending application Ser. No. 07/446,221, filed on even date herewith. In this encoder, a pair of tracks provide rotational information while another track contains an index that marks the neutral position of the handle, and the encoder. The output of the encoder is supplied as an input to a control circuit 110 (FIG. 6).

Figure 4:
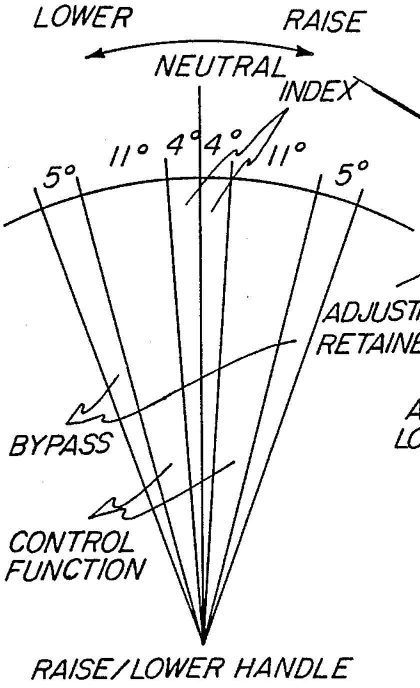
FIG. 4 is a diagram representing the areas of control with respect to a raise/lower control handle's shaft position.
Figure 6:
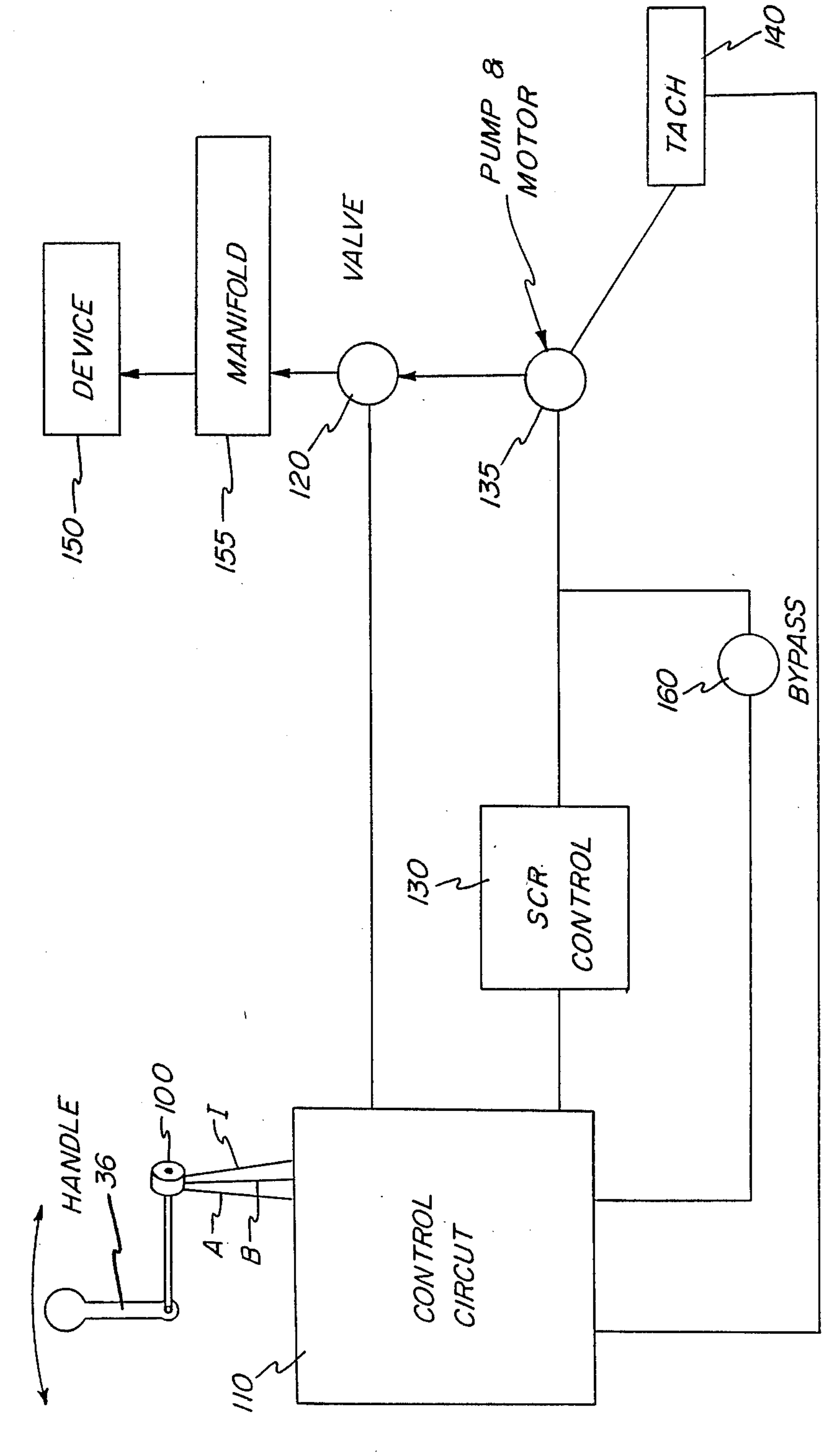
FIG. 6 is a simplified electrical block diagram showing the various major components comprising the present invention.

When the handle 36 is moved forward, in FIG. 3, or to the right in FIG. 6, the encoder will provide three output signals on lines A, B and I. Lines A and B represent the signals sensed by the photodetectors monitoring the pair of encoder tracks monitoring actual movement of the handle while line I represents the output from the photodetector monitoring the index track. As shown in FIG. 4, the handle must move approximately 4 degrees from its neutral position before the control function is enabled. This is due to the action of the control circuit 110 responding to the output of the index track signal I. Once the handle control function is enabled, the next 6 degrees of movement of the handle will cause the control circuit 110 to provide an output to a servo-controlled valve 120 which opens slowly at first, as shown. The relationship between handle position and the valve opening can be controlled by appropriate software in the control circuit 110.

Figure 5:
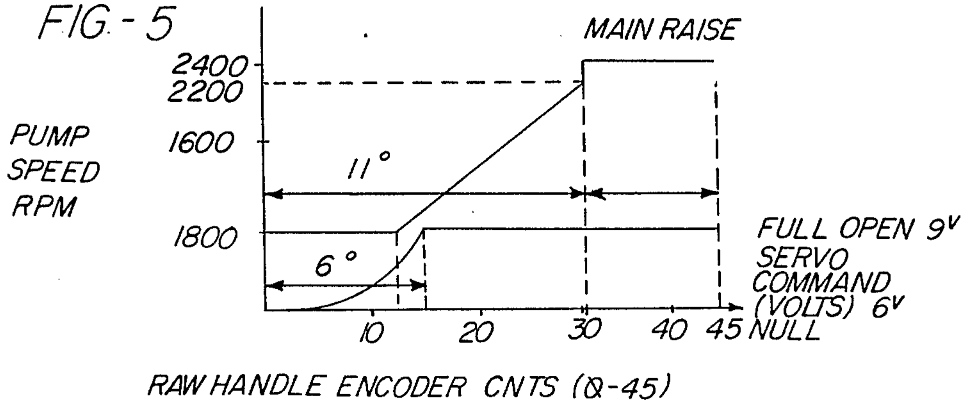
FIG. 5 is a chart showing the relationship between the control handle's shaft position and the position of a hydraulic valve and the speed of the hydraulic pump.

The control circuit also provides an output to SCR control circuit 130 which supplies current to a pump and motor 135 to cause the pump to rotate at a minimum predetermined speed, shown as 800 rpm in FIG. 5. The actual speed of the pump is monitored by a tachometer 140 and this information is fed back to the control circuit 110 to a conventional feed back circuit to maintain the pump at the desired speed when under varying load conditions.

As the handle is moved further forward, a point is reached where the pump motor speed begins to increase. The pump motor speed has been kept to a minimum to minimize the load on the batteries supplying power to the vehicle, but as the control handle is still further moved forward, additional pump speed is now required to supply the necessary hydraulic flow to the utilization device 150. In some installations, a manifold 155 may be placed between the control valve 120 and the device 150.

When the handle 36 reaches the end of the control range, the control circuit senses this position and causes a by-pass relay 160 to energize, thus by-passing the SCR control 130, further improving the efficiency of the system and reducing the heat generated in the SCR circuit.

Clearly, operating the pump motor at a reduced speed during the initial movement of the control handle 36, and reducing the speed as the control handle is returned to its neutral position, provides the operator with superior control of the hydraulic flow supplied to the utilization device. In the case of a lift truck, the utilization device may be the lift forks, or in a turret stockpicker, it might be the operator's platform. In either case, the feathered control of the hydraulic flow provided by the method and apparatus of this invention give the operator an improved feel and control over the functions of the vehicle.

This is especially apparent on a turret stockpicker that contains an auxiliary mast that operates at a slower lifting speed. Here again, the pump motor can operate at a reduced speed and all of the metering is performed by a hydraulic control valve.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claim.

What is claimed is:

1. In an apparatus for supplying a controlled hydraulic pressure and flow to a utilization device, said apparatus includes

- a control handle moveable through a predetermined distance,
- a hydraulic pump, an electric motor for driving said pump to supply hydraulic fluid under pressure, and a hydraulic valve responsive to the position of said control handle for controlling the flow of hydraulic fluid to the utilization device, the improvement comprising
  - means for sensing the position of said control handle,
  - means responsive to said sensing means for controlling the speed of said pump motor, said controlling means including
  - means for establishing and maintaining a minimum pump motor speed, and
  - circuit means for controlling said pump motor speed as said control handle is operated in an intermediate position.

2. The apparatus of claim 1 wherein said pump motor speed is increased before further opening of said valve which will exceed the present capacity of the pump.

3. The apparatus of claim 1 wherein said motor pump speed is increased at a predetermined rate prior to said hydraulic valve becoming fully opened.

4. The apparatus of claim 1 further including feedback means for maintaining a desired pump motor speed established by the position of the control handle.

5. The apparatus of claim 1 further including means for bypassing said circuit means when maximum pump motor speed has been reached.

6. The apparatus of claim 1 further including means for comparing the actual speed of said pump motor with a desired speed determined by said circuit means.

7. A method for controlling the application of hydraulic pressure and flow from a motor driven pump through a hydraulic control valve to a utilization device in response to the position of a control handle, said method including the steps of establishing and maintaining a minimum pump motor speed, controlling said hydraulic control valve through which hydraulic pressure and flow is supplied to the utilization device by means of said handle wherein, as said handle is moved from an off to an intermediate position, said valve will progress from a fully closed position to a fully open position, and controlling said pump motor speed further to control hydraulic flow in response to movement of said handle from an intermediate position, prior to said valve becoming fully open, to an on position.

8. The method of claim 7 further including the step of contouring the pump motor speed as said control handle is moved from approximately its one-third on position to its two-thirds on position.

9. The method of claim 7 further including the step of increasing said pump motor speed linearly from said minimum speed to its maximum speed.

10. The method of claim 7 wherein including the step of rotating said control handle and providing an initial dead band of approximately 4 degrees, thereafter opening said hydraulic valve from its fully closed to its fully open position from 4 degrees to 10 degrees of rotation, increasing said pump motor speed from approximately 5 degrees to 17 degrees, and providing a by-pass position for last 5 degrees of rotation.

11. The method of claim 7 wherein the increase of pump motor speed overlaps the opening of said valve to provide a stepless transition from valve control to pump motor control of the hydraulic pressure.

12. An apparatus for supplying a controlled hydraulic pressure to a utilization device including a control handle moveable through a predetermined distance;

a hydraulic pump;

an electric motor for driving said pump to supply hydraulic fluid under pressure;

a hydraulic valve responsive to the position of said control handle for controlling the flow of hydraulic fluid to the utilization device, said valve becoming fully open at an intermediate handle position;

an optical encoder for sensing the position of said control handle, said optical encoder including a wide index;

circuit means responsive to the output of said optical encoder for controlling the speed of said pump motor, said circuit means including means for establishing a minimum pump motor speed for the initial movement of said control handle, and means for controlling said pump motor speed at a predetermined rate as said control handle is operated from an intermediate position to an on position.

13. The apparatus of claim 12 further including relay means for by-passing the means for controlling said pump motor speed thereby to improve electrical efficiency while operating at maximum motor speed.

* * * * *